Dec. 4, 1956     G. L. CRAMER ET AL     2,772,794
MATERIAL HOISTING AND HANDLING MECHANISM FOR VEHICLE
Filed March 30, 1954     6 Sheets-Sheet 1

INVENTOR.
George L. Cramer
Amos Raffensberger
Eli R. Strine
BY
Attorney

Dec. 4, 1956   G. L. CRAMER ET AL   2,772,794
MATERIAL HOISTING AND HANDLING MECHANISM FOR VEHICLE
Filed March 30, 1954   6 Sheets-Sheet 2

INVENTOR.
George L. Cramer
Amos Raffensberger
BY Eli R. Strine

Attorney

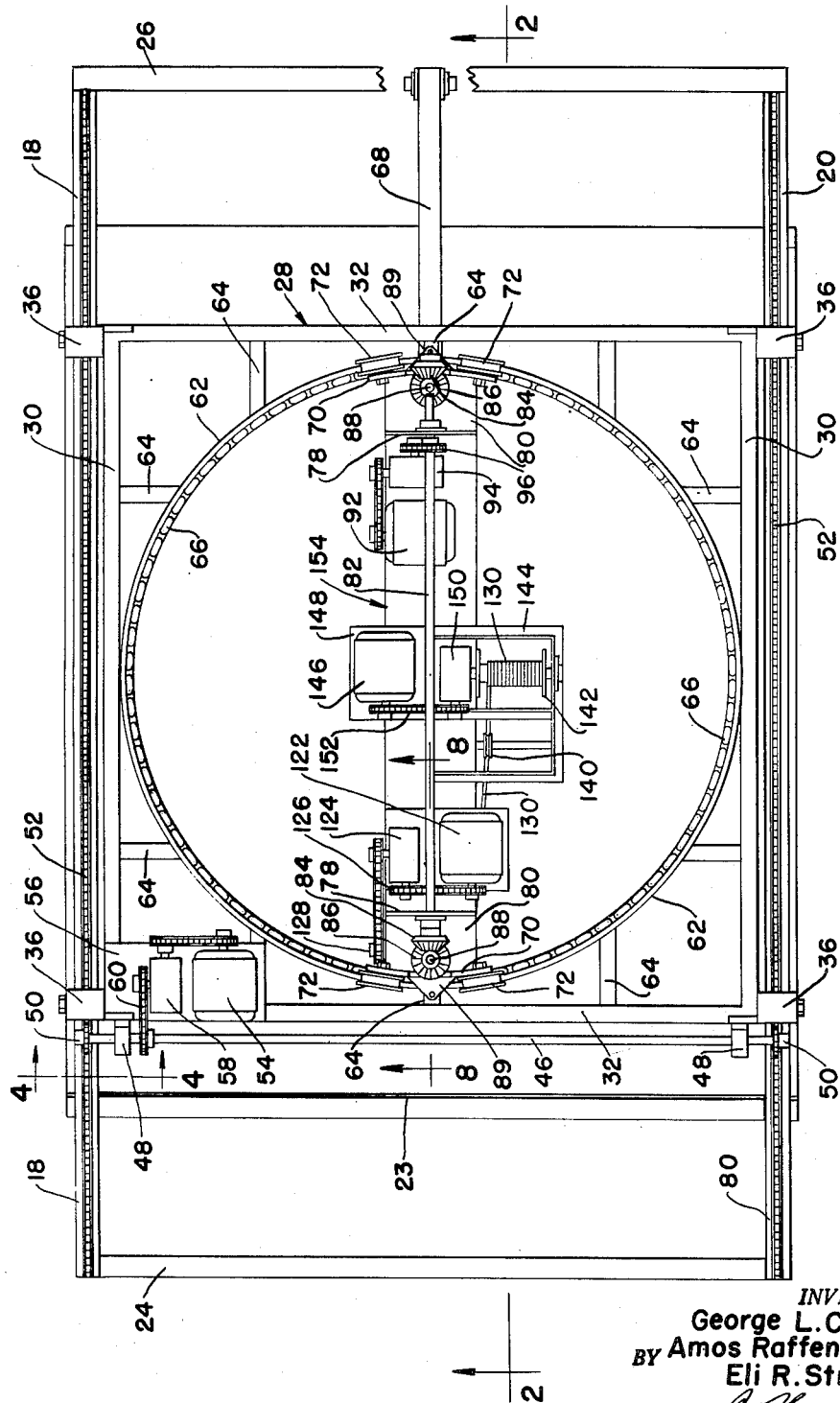

Dec. 4, 1956  G. L. CRAMER ET AL  2,772,794
MATERIAL HOISTING AND HANDLING MECHANISM FOR VEHICLE
Filed March 30, 1954  6 Sheets-Sheet 4

*INVENTOR.*
*George L. Cramer*
BY *Amos Raffensberger*
*Eli R. Strine*
Attorney

Dec. 4, 1956     G. L. CRAMER ET AL     2,772,794
MATERIAL HOISTING AND HANDLING MECHANISM FOR VEHICLE
Filed March 30, 1954     6 Sheets-Sheet 5

INVENTOR.
George L. Cramer
BY Amos Raffensberger
Eli R. Strine

Attorney

INVENTOR.
George L. Cramer
BY Amos Raffensberger
Eli R. Strine

Attorney ed States Patent Office
2,772,794
Patented Dec. 4, 1956

2,772,794

MATERIAL HOISTING AND HANDLING MECHANISM FOR VEHICLE

George L. Cramer, Amos Raffensberger, and Eli R. Strine, York, Pa., assignors to Side-O-Matic Unloader Corporation, York, Pa., a corporation of Pennsylvania Application March 30, 1954, Serial No. 419,644

18 Claims. (Cl. 214—75)

This invention relates to improvements in material hoisting and handling mechanism for use particularly on vehicles such as motor trucks. However, the invention is not to be restricted for use with this specific type of vehicle inasmuch as it readily is adaptable to other types of vehicles. More particularly, but without restriction thereto, the material hoisting and handling mechanism specifically illustrated and described herein is adapted especially to the loading, carrying, and unloading of readily stacked items such as concrete blocks. The entire mechanism is power actuated, whereby no manual handling of such items is required and, more importantly, substantially no damage to the items results.

The loading, unloading and transportation of relatively fragile items or material such as brick, concrete blocks, and the like present a substantial problem in guarding against the breakage and chipping of such items, particularly during the loading and unloading of the same upon a vehicle. Particularly since such items are relatively heavy, workmen have a tendency to handle these items quite roughly and breakage or chipping of corners from these items frequently results. Broken blocks or those which have chipped corners often are unusable as construction material, particularly when such items are to be used in making a finished face for a building structure. Hence, it frequently occurs that such broken or badly chipped blocks and bricks are unusable and therefore comprise waste which adds to the expense of a structure.

Until recently, little effort was made to develop practical loading and unloading devices for handling material of this nature and, even at present, especially in handling concrete blocks, manual labor largely still is resorted to particularly in unloading such blocks from a truck. Some advances have been made thus far in providing power operated loading means which are adapted to load items of this nature upon a truck. However, upon such load of blocks being delivered to the site where they are to be used, the loading mechanism employed at the manufacturing plant for loading the blocks is not available for unloading the same.

A few vehicles equipped with loading and unloading mechanisms have been developed recently but such mechanisms as are currently used in the building trades are very heavy, costly, complicated and are restricted to loading and unloading only from the rear end of the vehicle. Such characteristics have prevented them from being widely adopted in the building trades. Further, the fact that such mechanisms as are available are restricted to loading and unloading from the rear end only limits the effective use thereof and, frequently, requires moving the truck in the midst of a loading or unloading operation in order to provide unloading space.

The present invention obviates these undesirable characteristics of presently available mechanisms of this nature and provides a highly efficient, rugged, easily operated, power actuated, hoisting and handling mechanism attachable to the bed of a vehicle so as to be portable therewith, whereby said mechanism not only may be used to load the vehicle but also unload the same when it reaches the sites at which the material is to be used. Further, the mechanism embodying the principles of the present invention also is much more versatile in use than those presently available due to the fact that said mechanism not only may be used to load and unload items such as concrete blocks and otherwise from the rear end of the vehicle but, said mechanism also is equally capable of loading and unloading such items from either side of the vehicle.

Still further, in its preferred embodiment, the various movable members of the mechanism embodying the principles of the present invention are energized by a limited number of selectively operable electric motors powered by an auxiliary generator and control mechanism driven by the engine of the vehicle. The essential components of the present invention comprise a pair of overhead track members preferably rigidly mounted above the bed of the truck and longitudinally of which a frame is movable therealong. Such frame includes a circular track substantially centrally thereof which supports a boom that, at one end, extends substantially beyond said circular track in cantilever manner. The boom supports a traveling sheave movable from one end to the other of said boom and a hoisting cable is supported by said sheave. The cable, in turn, supports a material handling and carrying unit which may be of various types respectively adapted for handling items or materials of different nature. In the specific description and illustration of the invention herein, the material handling and carrying mechanism for a unit is designed particularly for the handling of concrete blocks; especially concrete blocks having conventional holes or openings therethrough. However, the hoisting and handling mechanism of the invention may be used in relation to another type of material which may be supported by a cable or otherwise from the traveling sheave of the mechanism and, thus, the invention is not to be restricted for use with the specific type of material engaging and supporting unit illustrated and described herein. Also, in the preferred embodiment of the invention, the various prime movers, specifically illustrated as electric motors, which actuate the frame along the longitudinal track members, the sheave along the boom, rotate the boom about the axis of the circular track, and raise and lower the material supporting unit which depends from the sheave, all are selectively controllable preferably from a single station such as a portable switch box having the required number of push buttons thereon for operating the various prime movers in either direction as well as starting and stopping the same. By such operation, under normal circumstances of use of the present invention, there is no need for any manual handling of the material while being loaded upon, transported by, or unloaded from the vehicle. More importantly, all handling of the material as described above is accomplished without damage to the material if the mechanism is operated correctly. Thus, substantial savings are achieved in using the present invention as compared especially with the manual handling now so commonly used in loading, transporting, and unloading material such as bricks and concrete blocks.

In order that the present invention might be utilized with the greatest efficiency, the vehicle to which the hoisting and handling mechanism is attached also preferably is provided with adjustable supporting mechanism at each corner of the bed of the vehicle, said supporting mechanisms being engageable with the ground or pavement in an adjustable manner, whereby, during the movement of the sheave along the boom, as well as the rotation of the boom about its circular track, no substantial tilting of the bed of the vehicle will take place. Further, the bed supporting mechanism, in its most preferred embodiment, is of such nature that even very limited tilting of the bed of the vehicle results automatically in compensation of such tilting by the supporting mechanism and substantial stabilization of the position of the bed of the vehicle is achieved. At the completion of a loading or unloading operation, such supporting mechanisms readily are positionable well above their normal ground engaging positions so as not to interfere with the movement of the vehicle along a highway or otherwise.

It is also well known that regulations in effect in most States require that the overall width of a vehicle must not exceed eight feet. The design of the material handling and hoisting mechanism comprising the present invention is such that maximum use of such restricted width of space may be utilized in the loading and transporting of material and, further, the positions of the supporting mechanisms at the corners of the bed of the vehicle are likewise so arranged that maximum benefit of the width of the bed of the vehicle is utilized in stabilizing the bed during loading and unloading operations, and when such supporting mechanisms are retracted to their inoperative positions, no excecessive width thereof results.

Still another beneficial feature of the present invention resides in the design of the load or material engaging and supporting unit which is suspended from the traveling sheave of the invention. Such unit includes adjustable mechanism, whereby a loaded supporting unit may be suspended from the traveling sheave, particularly from the cable depending therefrom, substantially directly above the center of gravity of the load of material held by the unit. Said adjustable mechanism may be varied to render the unit capable of supporting loads of various sizes or amounts and yet have the same supported by the sheave at a point substantially directly over the center of gravity of the load.

Details of the foregoing advantageous features of the invention, and other advantages and objects thereof, are illustrated in the accompanying drawings and described in the following specification, of which the drawings comprise a part.

In the drawings:

Fig. 3 is a top plan view, partly broken away to illustrate better certain details of the invention, of the material hoisting and handling mechanism per se shown in Fig. 2.

Figure 1:
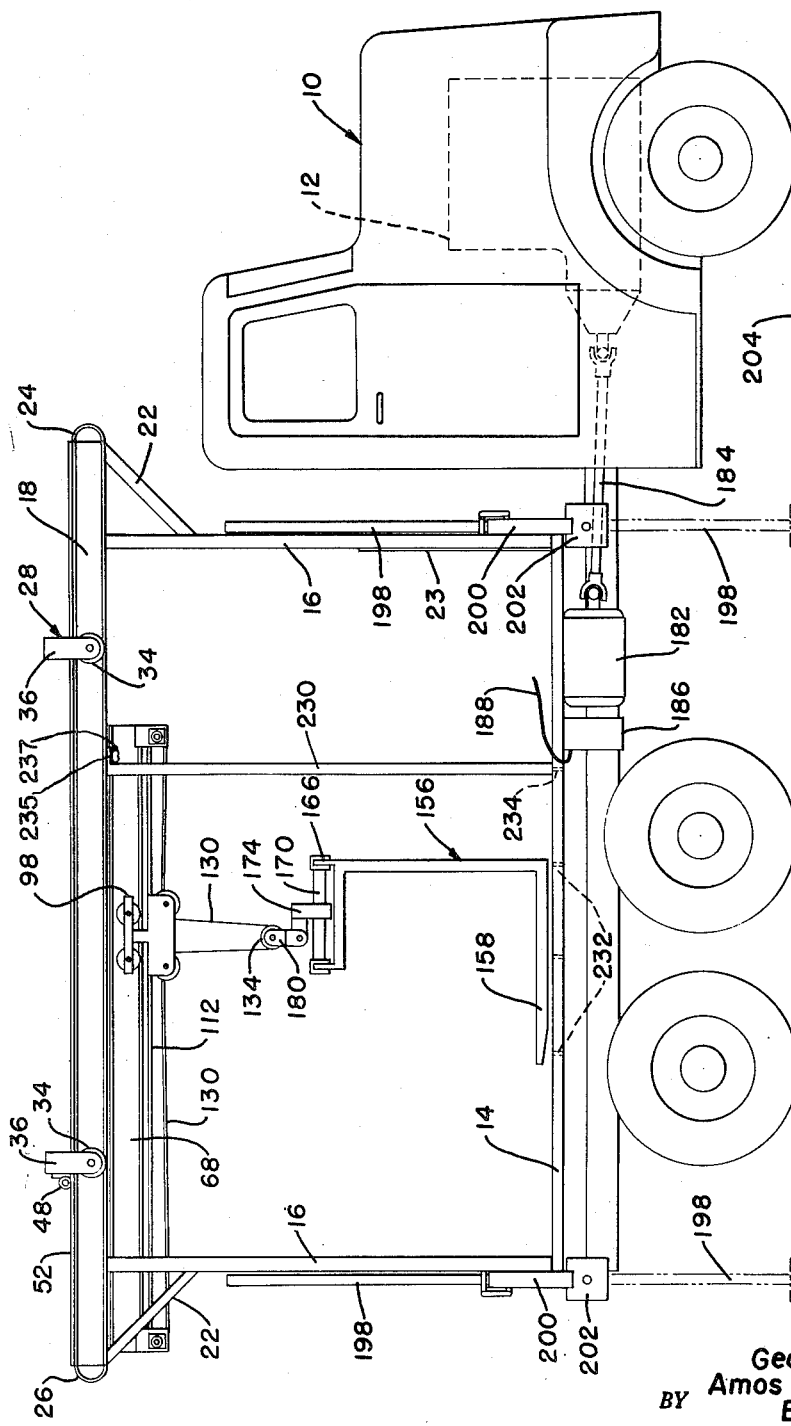
Fig. 1 is a side elevation of an exemplary vehicle upon which is mounted a material hoisting and handling mechanism embodying the principles of the present invention. In this view, supporting mechanisms at the corners of the bed of the vehicle are shown in full lines in elevated position and, in broken lines, in extended, ground engaging positions.

Fig. 1 of the drawings illustrates an exemplary vehicle specifically comprising an automobile truck 10 powered by a conventional gasoline engine or motor 12. It is to be understood however that the vehicle shown herein merely is exemplary and other types of vehicles may be used in conjunction with the material hoisting and handling mechanism embodying the present invention. The vehicle also has a preferably horizontal load supporting bed 14. Upright, supporting members 16 are provided preferably adjacent each corner of the bed 14 of the vehicle and at the lower ends thereof are fastened to said bed. If desired, the upright members 16 may be positioned somewhat inward from the opposite ends of the bed however. Thus, in the preferred construction, there are two upright members 16 at each side of the vehicle bed. Attached to and supported by the upper ends of each pair of upright members 16 at the sides of the bed 14 are substantially horizontal, parallel track members 18 and 20. For convenience, as well as adaptability, the track members 18 and 20 preferably comprise I-beams which extend at the opposite ends thereof past the upright members 16 as clearly shown in Figs. 1 and 2. These track members are spaced apart in a transverse direction a distance substantially equal to the width of the bed 14. Braces 22 of suitable structural steel formation extend at an angle between the upright members 16 and the opposite ends of the track members 18 and 20, as clearly shown in Figs. 1 and 2, for purposes of preventing longitudinal swaying of movement of the track members relative to the bed.

For convenience in loading material and particularly stacked material upon the bed 14, a vertical head plate 23 may be provided adjacent the forward end of the bed 14. Said plate, for example, may be affixed to the forward upright supporting members 16.

The extension of the opposite ends of the track members 18 and 20 beyond the upper ends of the upright members 16 not only affords greater possible movement of the longitudinally traveling frame, to be described, along said track members but, such track member extensions afford ready means for use of the braces 22 in such a manner as to afford a maximum amount of clear space above the bed 14 of the vehicle. The track members 18 and 20 are held in transversely spaced position by two end members 24 and 26 which preferably are semi-circular in cross-section and may be formed by longitudinally dividing tubular pipe. These end members, not only hold the track members 18 and 20 in spaced relationship but, preferably being welded to the ends of the upper and lower flanges of said I-beam type track members, they brace said track members against transverse sway or movement relative to the longitudinal axis of the bed 14. Further, as shown particularly in Fig. 3, the ends of the end members 24 and 26 substantially are co-extensive with the outer edges of the upper flanges of the I-beams forming the track members 18 and 20. This provides at the ends of the track members stop means projecting laterally beyond the center webs of the track members 18 and 20, for purposes to be described.

Movably mounted between the track members 18 and 20, and preferably substantially within the plane thereof, is a frame 28 shown in the exemplary illustration herein as being composed of pairs of flange structural members connected at their ends to form a preferably square or rectangular frame. The pair of side members 30 of said frame are substantially parallel to and spaced slightly inward from the inner edges of track members 18 and 20. The end members 32 of frame 28 are disposed also between the track members 18 and 20 and are connected at their ends to the ends of side members 30 of said frame. Channel structural members are suited admirably for fabrication of the frame 28.

Figures 4, 7:
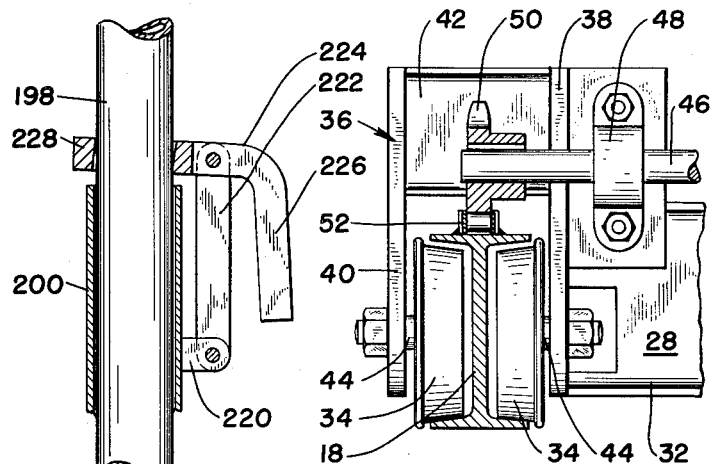
Fig. 4 is a fragmentary vertical sectional view, taken on the line 4—4 of Fig. 3 and showing details of the mechanism for moving the frame of the device along the longitudinally extending track members.
Fig. 7 is a vertical sectional view showing details of the supporting mechanism shown in Fig. 5, said view being taken on the line 7—7 of Fig. 6.

Frame 28 is supported by the track members 18 and 20 for longitudinal movement therealong by any suitable anti-friction means such as rollers 34 which preferably are provided in pairs adjacent each corner of the frame 28. Details of the roller mountings are best shown in Fig. 4. It is to be understood that any other suitable supporting means for the rollers may be used and, in the exemplary illustrations shown and described herein, the pairs of rollers 34 are supported by saddle-like supporting members 36. Referring particularly to Fig. 4, each saddle-like member 36 comprises a vertical plate 38 which is welded or otherwise fixed to the end portion of one of the side members 30 of frame 28. An outer plate 40, vertically parallel to plate 28, is connected to the latter by a spacing block 42 which, for convenience, may be a short section of I-beam. Plates 38 and 40 may be welded for example to spacing block 42 to comprise a rigid and integral saddle-like member 36, the side plates of which straddle one of the track members as clearly shown in Fig. 4. The rollers 34, which for example may be mounted on anti-friction bearings carried by stub shafts 44 bolted to slide plates 38 and 40, respectively ride upon the oppositely extending flanges of the I-beam rails which comprise the lower web thereof, as clearly shown in Fig. 4. It will be understood that all of the saddle-like supporting members 36 and the rollers supported thereby are similar.

Frame 28 is propelled longitudinally along track members 18 and 20 by power means operable relative to both tracks so as to insure simultaneous movement, in either direction, of both sides of frame 28. One effective means of achieving this is illustrated herein and comprises a shaft 46 rotatably supported by bearings 48 carried, for example, by one end member 32 of frame 28, as best illustrated in Figs. 3 and 4. Shaft 46 extends at its end beyond the sides of frame 28 and the spur or spocket gears 50 are fixed to said ends of shaft 46.

Extending preferably along the upper surface of each of the track members 18 and 20 is rack-like means 52 which respectively are engaged by the sprocket gears 50. Although a conventional rack may be used, if desired, it has been found to be relatively inexpensive and highly effective to use lengths of flexible sprocket chain consisting of articulated links and similar to bicycle chain, these links of chain being welded or otherwise fixed at spaced intervals to the upper surfaces of track members 18 and 20 as clearly shown in Fig. 3. One advantage of using this type of rack-like structure is that, if one or more links become broken or damaged, they can easily be replaced without requiring expensive operations or special tools.

Shaft 46 is rotatably driven in either direction by means comprising a power energizable prime-mover such as an electric motor 54 supported, for example, upon a substantially horizontal plate 56 which is welded or otherwise fixed to one corner of frame 28. Motor 54 may have a reduction gear mechanism built therein or said motor may be used to operate a reduction gear box 58, the output member of which operates shaft 46 such as by means of a chain 60 or otherwise. Motor 54 preferably is of the reversable type, whereby shaft 46 may be rotated in opposite directions, as required, for purposes of simultaneously moving both sides of frame 28 longitudinally of track members 18 and 20.

From Fig. 1 particularly, it will be seen that the concavity of end members 24 and 26 is of such size that it readily can receive rollers 34 of the supporting means for frame 28. Thus, should the frame 28 be moved by accident or otherwise to either end of the track members 18 and 20, engagement of the rollers with the end members 24 or 26 will halt such movement of the frame. Under these circumstances, to prevent injury to motor 54, a suitable safety clutch may be provided within said motor or the gear reduction mechanism thereof.

Figure 2:
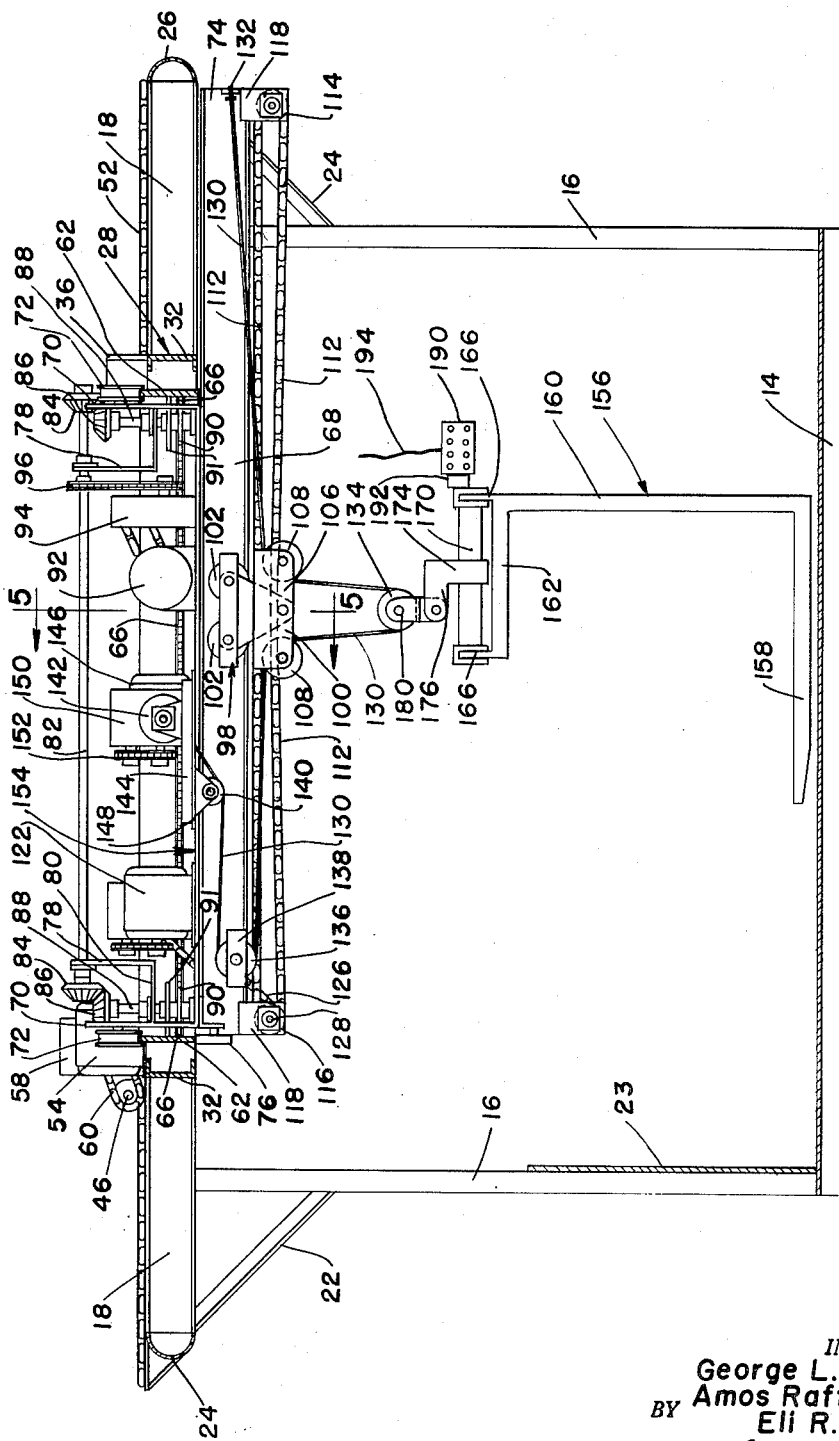
Fig. 2 is a longitudinal sectional elevation, taken on the line 2—2 of Fig. 3, and illustrating, on a larger scale than that used in Fig. 1, the material hoisting and handling mechanism per se, this figure illustrating more details of the same than Fig. 1 and the view in Fig. 2 being from the opposite side of the vehicle than the view in Fig. 1.

Fixed within and preferably centrally of frame 28 is a circular track 62 which is vertically cylindrical, as shown in Fig. 2, the height of said track being adequate to insure rigidity thereto. Track 62 is rigidly connected to frame 28 at a plurality of substantially evenly spaced positions around the periphery of said circular track 62, the connecting means being shown best in Fig. 3. These consist of a plurality of vertically extending plates 64 which extend between track 62 and frame 28 and are welded or otherwise securely affixed thereto at the ends of said plates. If convenient, the track 62 may be directly welded to the side or end members of frame 28 where these are contacted by the circular track. Also, extending around the inner surface of track 62 and fixed thereto at spaced intervals is rack-like means 66 which, as in regard to rack-like means 52, preferably comprises an articulated link chain which is welded or otherwise fixed at frequent intervals to the inner surface of track 62.

Extending across the lower end of circular track 62 is a boom 68 which is diametrical relative to track 62 and, at one end, said boom 68 extends horizontally beyond the periphery of track 62 in cantilever manner. This is best shown in Fig. 2 as well as in Fig. 3. For compactness, boom 68 is only slightly spaced below the lower end of track 62. Fixed to and projecting vertically upward from the upper surface of boom 68 are a pair of supporting members or plates 70. Said plates are positioned in closely spaced relationship to diametrically opposed inner surface portions of circular track 62. The upper ends of each of the plates 70 rotatably support a pair of circumferentially spaced, anti-friction mounted rollers 72. The rollers 72 preferably are peripherally grooved to receive the upper edge of circular track 62. By providing pairs of spaced rollers at either end of the portion of boom 68 which extends across circular track 62, no undue amount of tilting of the boom relative to the track member 62 about an axis parallel to the boom may take place. Also, in order that the outer or cantilever end 74 of the boom may not move downward appreciably as when a load is subjected downwardly against said end, a stabilizing roller 76 is rotatably supported by the end of boom 68 opposite the cantilever end as clearly shown in Fig. 2. Stabilizing roller 76 rotatably engages the lower surface of circular track 62.

Fixed relative to each of the vertical supporting members 70 is a bracket having a vertical arm 78 and a horizontal arm 80 fixed at its inner end to plate 70. The upper ends of vertical arms 78 support bearings which rotatably receive drive shaft 82 which extends between vertical arms 78 of said brackets.

Fixed to the outer ends of drive shaft 82 are bevel gears 84 which respectively mesh with other bevel gears 86 fixed to the upper ends of vertically disposed shafts 88 which extend through suitable bearings carried by horizontal arms 80 and the upper surface of boom 68. Fixed to each of the shafts 88 is a spur gear 90 both of which engage rack-like means 66 at diametrically opposed positions within circular track 62. In view of the disposition of the sets of bevel gears 84 and 86, it will be seen that, as drive shaft 82 is rotated in either direction, the spur gears 90 act in unison to rotate the boom 68 about the vertical axis of circular track 62 through a full 360°, if desired, in either direction. During such movement, boom 68 will extend diametrically across the lower end of circular track 62. Further, preferably fixed to vertical shafts 88 are stabilizing circular discs 91 which are driven by said shafts in unison with spur gears 90. The discs 91 will engage the inner surface of circular track 62 at diametrically opposed positions and thereby prevent any appreciable movement of boom 68 relative to track 62 in a direction longitudinally of said boom.

To aid the discs 91 in stabilizing the boom 68, a pair of exterior rollers 85, supported on stub shafts 87, preferably by antifriction bearings, engage the exterior of track 62 opposite the discs 91. Brackets 89, fixed to vertical members 70, support shafts 87.

Shaft 82 is driven by a power energizable prime mover such as an electric motor 92 which, for convenience, may be affixed to the upper surface of boom 68 within the confines of circular track 62. By means of either a built-in gear reduction mechanism, or a gear box 94, the power output of prime mover 92 is connected to shaft 82 by any suitable means such as a chain 96.

Figure 5:
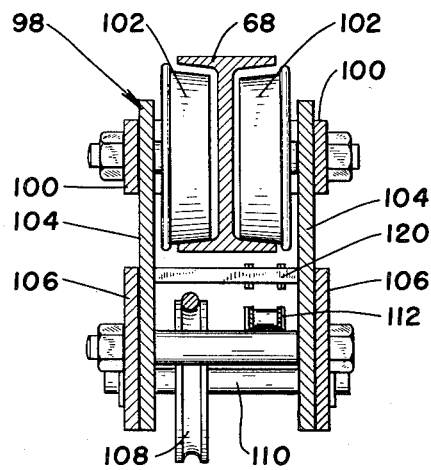
Fig. 5 is a vertical sectional view of details of the sheave structure mounted for movement along the boom of the mechanism, said view being taken on the line 5—5 of Fig. 2.

Movable along boom 68 is a traveling sheave 98 comprising side members 100 which rotatably support in longitudinally spaced relationship along the boom, a pair of rollers 102, there being a pair of such rollers on each side of the boom 68 which, in its preferred embodiment, comprises an I-beam. Details of the sheave 98 and the mounting of the rollers 102 is best illustrated in Fig. 5. Depending from the rollers 102 and the supporting shafts therefor which extend through side members 100 are a pair of plates 104 which, at the lower ends thereof, rockably support vertical plates 106 which extend horizontally in opposite directions for purposes of rotatably supporting therebetween grooved pulley wheels 108 carried by shafts 110. The articulated side members 100, plates 104 and vertical plates 106 comprise the frame of said sheave 98 which is movable longitudinally along boom 68 in opposite directions by means of a suitable flexible member such as chain 112, preferably an articulated link sprocket chain, which passes around rotatably supported sprocket wheels 114 and 116, shown in Fig. 2, adjacent opposite ends of boom 68. Said sprocket means are supported by any suitable structure such as depending brackets 118. The lower course of the sprocket chain 112 passes through the sheave as clearly shown in Fig. 5 particularly and, after passing around the sprocket wheels 114 and 116, said chain extends therefrom to the opposite ends of the sheave 98 and are secured to said sheave by any suitable transverse means 120 shown best in Fig. 5.

Also supported by the upper surface of boom 68, within the confines of circular track 62, is another power energizable prime mover such as an electric motor 122 which, either by means of a built-in gear reduction unit or a separate gear box 124 drives power transfer means such as sprocket chain 126 and operates drive shaft 128 to which sprocket wheel 115 is fixed. Prime mover 122 preferably is of the type which may be driven in either direction so as to effect movement of sprocket wheel 116 in opposite directions, whereby sheave 98 may be moved longitudinally in either direction along boom 68, as desired.

The mechanism is provided with a hoisting cable 130 which is affixed at one end 132, for example, to the outer end of boom 68. From there, the hoisting cable 130 extends around the foremost pulley wheel 108, down around a single sheave 134, rotatably supported by the upper end of load supporting means to be described, thence upward around rearmost pulley wheel 108, rearwardly around idler pulley 136 which is rotatably supported by bracket 138 fixed to boom 68, thence forwardly past another bracket supported idler pulley 140 and up to a coiling drum 142. The coiling or hoisting drum 142, to which the other end of hoisting cable 130 is attached, is supported by a suitable frame or bracket 144 shown clearly in Figs. 2 and 3, said drum being energized or powered by another power energizable prime mover such as electric motor 146. The motor 146 also is supported either upon the upper surface of boom 68 or a plate or platform 148 fixed thereto. Either through a self-contained gear reduction mechanism or a separate gear box 150, power from motor 146, selectively driven in either of its opposite directions, causes the drum 142 to either coil or uncoil the hoisting cable 130 so as to effect lowering or raising of the sheave 134. Motor 146 and gear box 150 may be connected by any suitable means such as chain 152. Also, it will be noted that the coiling drum 142, as well as its prime mover 146, and driving mechanism is compactly located directly above the boom 68 and within the confines of circular track 62.

For purposes of the present description and the appended claims, that portion of the upper flange of I-beam boom 68 which extends diametrically across the lower end of circular track 62 is regarded as an auxiliary frame movable relative to circular track 62 about the vertical axis of said track. The three power energizable prime movers comprising specifically illustrated electric motors 92, 122 and 146 which are fixedly supported relative to said upper flange portion of boom 68, or auxiliary frame 154, as it may be so regarded, compactly within the confines of circular track 62. All of said prime movers, as well as the gear reduction mechanism actuated thereby, and the coiling drum 142 likewise are compactly arranged substantially within the confines of circular track 62. However, the arrangement thereof is such that for purposes of servicing or otherwise, ready access may be had to any of these elements.

Figures 8, 9:
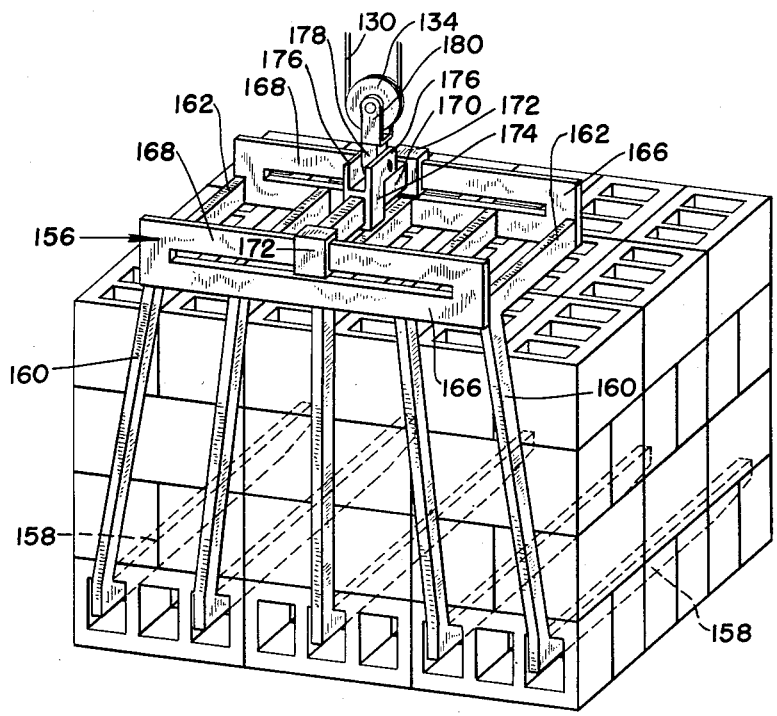
Fig. 8 is a vertical sectional elevation taken on the line 8—8 of Fig. 3, and illustrating, fragmentarily, details of mechanism which supports the boom relative to the circular track.
Fig. 9 is a perspective view showing an exemplary load or material supporting unit shown supporting an exemplary cube of concrete blocks.

Referring particularly to Figs. 1, 2 and 9, the present invention also comprises a material engaging and supporting unit 156. This specifically illustrated supporting unit is particularly adapted to engage a desired quantity of concrete blocks such as a cube or a fraction of a cube thereof. However, it is to be understood that the material handling and hoisting mechanism described herein above may be used in conjunction with any other desired type of material engaging and supporting member or unit, for example, may be utilized to load or unload a vehicle that is to transport said material.

The unit 156 comprises a plurality of substantially horizontally extending fingers 158 which are supported by upright members in transversely spaced relationship to each other, the members 160 being fixed to the fingers 158 at one end thereof or one edge of said unit 156. Attached to the upper ends of members 160 are horizontal members 162 which are substantially parallel to and extend over fingers 158. Thus, the articulated fingers 158, upright members 160, and horizontal members 162, comprise C-shaped handling members which are secured in spaced relationship to each other at their upper ends by substantially parallel plates 166 which are secured by welding or otherwise to the horizontal members 162. The articulated members 162 and plates 166 comprise frame-like means at the upper end of the unit 156, said frame-like means extending over the load supporting means or fingers 158.

The plates 166 are longitudinally slotted to provide at the upper portions of said plates, parallel rails 168. Extending between said rails is bar 170, the opposite ends of which have sleeves 172 slidably receiving the rails 168.

Slidably receiving and longitudinally movable along bar 170 is a sleeve member 174 having short arms 176 projecting preferably substantially horizontally therefrom, the arms 176 supporting between the outer ends thereof a block 178 to which a bail 180 is swivelly connected. The bail 180 rotatably supports sheave 134, around which passes hoisting cable 130.

It is to be understood that means other than those specifically illustrated may be utilized to secure hoisting cable 130 to the material engaging and supporting unit 156. However, in the specifically illustrated mechanism shown particularly in detail in Fig. 9, it will be seen that, by sliding the sleeve 174 along bar 170, and also by moving the sleeves 172 on the ends of bar 170 along the parallel rails 168 simultaneously, the sheave 134 may be positioned substantially directly above the center of gravity of the load of material supported by the fingers 158 or other means which support the load. Thus, if for example, the specifically illustrated fork arrangement comprising unit 156 is designed to support, when fully loaded, a full cube of concrete blocks, the sheave 134 is moved in the required several directions, transverse to each other, relative to bar 170 and rails 168, in order to dispose said sheave substantially centrally above the center of gravity of the load of blocks. However, if only a fraction of a full cube of blocks is to be handled by the unit 156, said amount is engaged by the fingers 158 and the sheave, by appropriately sliding the same relative to bar 170 and rails 168, is disposed substantially centrally above the center of gravity of said fraction of a cube of blocks. Thus, when the sheave and load attached thereto are either elevated or lowered by the hoisting cable 130, the quantity of blocks thereon will be supported in desired horizontal position so as to prevent spilling or dropping any of the blocks from the load. Thus, the supporting unit 156 is highly universal in character for holding and handling either a fully contemplated load or a fraction thereof while a load is suspended from a sheave or other supporting member arranged vertically above the center of gravity of the load disposed on the unit 156.

The sleeve member 174, when adjusted to desired position along bar 170, also automatically is locked in adjusted position thereon when elevating tension is placed upon sheave 134 by cable 130. By applying such hoisting force to the outer ends of horizontally extending arms 176, the sleeve member 174 is canted or tilted so as to place the ends of the sleeve openings in firm frictional engagement with bar 170, thereby preventing any movement between sleeve member 174 and bar 170 while the load is freely suspended from sheave 134. Adjustment of the sleeve member 174, as well as the sheave 134, in either of the desired transversely extending directions to dispose the sheave centrally above the center of gravity of the load is easily effected manually by providing suitable clearance between sleeves 170 and rails 168, as well as between sleeve member 174 and bar 170.

It has been stated hereinabove that the various prime movers 54, 92, 122 and 146 are electric motors. However, this type of prime movers is used primarily for expediency and economy. Other types of prime movers may be used such as hydraulically operated motors which could be operated from a single source of fluid pressure. However, when electric motors are utilized, the same may readily be supplied with electric power produced by a generator carried, for example, by the frame of the vehicle as shown in Fig. 1. This generator may be operated directly by a power take-off shaft 184 connected to the transmission of the engine 12. Electric current developed by generator 182 then is passed to suitable current control means 186 for purposes of assuring uniformity in supply of current to said motor. The controlled current from current control means 186 is carried to the various electric motors preferably by compound electric conduit 188 which is flexible and of a heavy duty nature. It will be understood of course that a separate pair of conduits is included in the compound conduit 188 for each motor and branch conduits are led from the outer end of compound conduit 188 to each motor in the vicinity of the auxiliary frame 156. Since such wiring is conventional, it is not believed that a circuit diagram is necessary.

The electric current supplied by the generator 182 and control means 186 is controlled to each motor by a multiple switch control box 190 shown in an exemplary position in Fig. 2 adjacent the upper end of the material supporting unit 156. It will be noted that four pairs of switch buttons are provided respectively for controlling movement of each motor in forward and reverse directions, as well as starting and stopping such motors. Said switches are of a sequence nature to achieve the desired results. If desired, the control box 190 may be attached removably to any suitable portion of the mechanism by means, for example, of a permanent magnet 192 affixed to the box 190. A compound electric conduit 194 of appropriate capacity carries the electric current to and from the control switch box 190.

In operation, the vehicle 10 is driven to a supply of material such as a warehouse or storage yard for concrete blocks and, by operating the appropriate switch of control box 190 which has been placed at a convenient location on the mechanism, the hoisting motor 146 is operated to elevate the material supporting unit 156, for example, from the bed 14 of the vehicle 10 to approximately the position shown in Fig. 2. This motor then may be stopped. Next, the motor 54 is energized to propel the frame 28 rearwardly relative to the track members 18 and 20 so as to move the projecting end of boom 68 rearwardly from the rear end of the bed 14 of the vehicle, for example. In lieu of this however, if it is desired to load the vehicle from the side thereof, the frame 28 is positioned as desired, midway for example of the track members 18 and 20, and motor 92 is energized to rotate the boom about the axis of circular track 66 until the outer end of boom 68 is projected laterally from one side or the other of the vehicle bed 14. The hoisting motor 148 then may be actuated to lower the material supporting unit 156 into engagement with a supply of blocks for example which are stacked in suitable formation and, upon being loaded with a desired quantity, the hoisting motor 146 then is reversed to elevate the load upon unit 156 by means of hoisting cable 130. Upon the load reaching a position slightly above the bed 14, the sheave operating motor 122 is started so as to move the sheave 190 from the outer end of boom 68 inwardly to a desired position above the truck bed 14.

Following the foregoing operations, the frame propelling motor 54 or the boom rotating motor 92 may be operated to place the boom 68 in desired position relative to the bed 14 of the vehicle so that the sheave 98 may be moved therealong to dispose the load of material where desired upon said bed. Then the hoisting motor 146 is operated to lower the load of material onto the bed 14 and further lowering of the unit 154 permits ready detachment of the fingers 158 from the stack of blocks which have just been placed upon the bed 14. It will be understood of course that unloading the material from the bed 14 of the vehicle takes place by reversing one or more of the cycle of movements described hereinabove as will be obvious from such description and illustration in the drawings.

In view of the swivel nature of the connection between hoisting sheave 134 and arms 176 of sleeve member 174, a load upon unit 156 readily may be pivoted about a vertical axis to extend in any desired direction to effect engagement of the fingers 158 with the load or disengagement thereof from the load, as desired. It has been found that positioning of the switch control box 190 on some portion of the unit 156 is effective to permit the operator to manually swivel the load while controlling the operation of the various motors of the mechanism. Also, it is to be understood that operation of more than one motor, in either direction, may take place simultaneously as, for example, when it is desired to move the sheave 98 along the boom 68 and also raise or lower the material supporting unit 156 relative to the boom. Still further, simultaneous movement of the frame 28 along the track members 18 and 20 also may take place as well as rotation of the boom about the vertical axis of circular track 62. By means of this, substantially universal handling or movement of the load during loading and unloading operations may take place by operating the handling and hoisting mechanism as desired.

Figure 6:
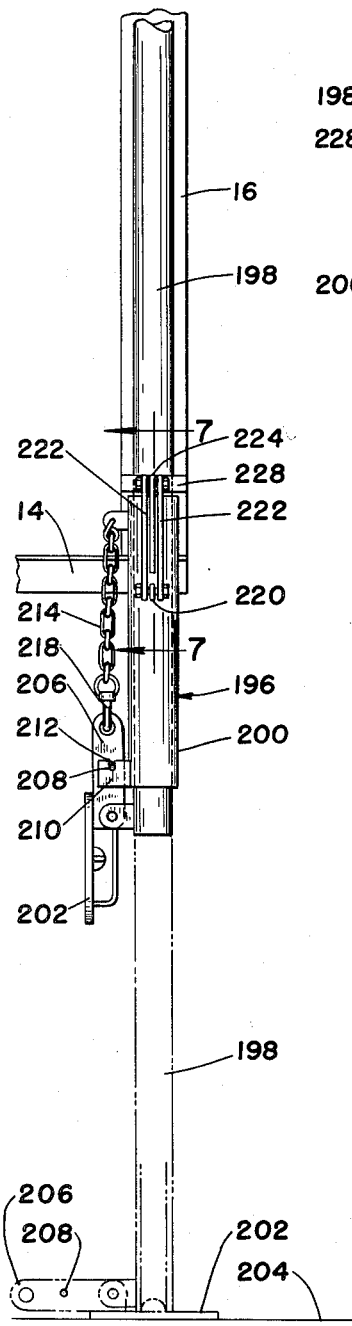
Fig. 6 is an enlarged vertical elevation of one supporting mechanism carried by one corner of the bed of the vehicle to support the bed during loading and unloading operations, the supporting mechanism being shown in full lines in elevated or inoperative position, and in broken lines, in extended or supporting position.

Particularly when material such as concrete blocks are being loaded or unloaded from one side or the other of the vehicle bed 14, the boom 68 will be projected laterally from said side of the bed. When the load supported by the unit 156 is depending from the outer end of boom 68, for example, the weight of the load will tend to tilt the bed 14. To prevent any substantial tilting of the bed, suitable bracing or supporting elements generally indicated 196 are carried by the bed 14, preferably at the corners thereof. Said elements each comprise a rod or tubular member 198 of suitable size to provide firm support for said bed 14. The member 198 is slidably received and supported by a sleeve 200 of substantial length which is fixed to the bed 14 and preferably to a portion of upright supporting member 16 by welding or otherwise. Details of this structure are shown in Fig. 1 out are more advantageously illustrated in Fig. 6. Refering to the latter figure particularly, it will be seen that the lower end of each member 198 is provided with a pivotally connected foot 202. In Fig. 6, the supporting mechanism is shown in elevated position which it occupies while the vehicle is in motion, in full lines, while, in broken lines, said mechanism is shown in extended or supporting position. When supporting the bed 14 by engagement with the ground or pavement surface 204, the foot 202 is pivoted to horizontal position as shown in Fig. 6 in broken lines. However, when the supporting member 198 is elevated to its inoperative position shown in full lines in Fig. 6, the foot 202 is pivoted to be disposed vertically as shown in full lines and thereby not project laterally beyond the widest dimension of the bed 14. Thus, the maximum width of the bed 14 may be utilized while affording relatively wide foot members to prevent the lower end of supporting members 198 from sinking into soft earth for example when supporting the bed 14.

Each foot member 202 has an extending arm 206 which is parallel to the bottom face of foot member 202 and, preferably, a pin 208 extends transversely therethrough. The lower end of guide sleeve 200 is provided with a laterally extending arm or pair of arms 210 which receive therebetween the arm 206 when the supporting member 198 is elevated as shown in full lines in Fig. 6. The pin 208 then is received within downwardly extending notches 212 provided in arms 210. This affords an expedient means for maintaining the supporting member 198 in its elevated or inopertiva position. However, to provide safety against the pin 208 being jostled from the notches 212, a safety chain 214 preferably is secured at one end to a bracket 216 on sleeve 200 and the other end thereof has a hook 218 which extends through a suitable aperture in the then uppermost end of arm 206 as clearly shown in Fig. 6.

Each of the guide sleeves 200 for supporting members 198 also support an automatically adjustable locking mechanism between sleeves 200 and members 198. When for example, part of the load has been removed from the bed 14, and the springs of the vehicle automatically tend to elevate said bed and the remaining load thereon, the members 196 may move downwardly freely relative to the guide sleeves 200.

After the supporting members 198 have moved downwardly as aforesaid so as to firmly engage the supporting surface 204, when subsequent tilting of the bed 14 occurs as during the shifting of the boom 68 to one side or other of the bed to load or unload some material, downward movement of the bed and guide sleeve 200 relative to any particular supporting member 198 is prevented by mechanism shown in end view in Fig. 6 and, in side view and on a larger scale in Fig. 7. This mechanism comprises a laterally extending ear 220 fixed to sleeve 200. Pivotally connected to either side of said ear and extending upward therefrom are a pair of links 222. The upper end of said links are pivotally connected to locking member 224 having a downwardly extending handle 226 which is manually operable and a locking collar 228 which is of dimensions to provide sturdiness. said collar surrounding supporting member 198. The aperture through locking collar 228 which receives supporting member 198 is only slightly larger than the diameter of member 198. Thus, upward movement of the member 198 relative to sleeve 200 tends to tilt the collar 228 and effect firm binding between member 198 and said locking collar 228, thereby arresting relative longitudinal movement in one direction between said guide sleeve 200 and supporting member 198. Thus, tilting of the bed 14 any appreciable amount automatically is prevented by said mechanism. However, upon further raising of the bed 14 such as after further unloading thereof has taken place, the supporting members 198 still further move downward automatically to effect firm engagement with the supporting surface 204 and such movement is permitted by locking collars 228.

In the preferred construction of the locking mechanism described above, the axis of the aperture in locking collar 228 is so arranged that when said locking collar is in engagement with the upper end of guide member 200, the supporting member 198 may move freely through said sleeve and locking collar. However, when movement of the member 198 in an upward direction takes place through sleeve 200, locking action between collar 228 and member 198 is effected as described above. Thus, as when the vehicle is fully unloaded for example, and it is desired to elevate the supporting members 198 to their retracted or inoperative position shown in full lines in Fig. 6, it is only necessary to engage the handles 226 and move them outwardly so as to dispose the locking collars 228 against the upper end of guide sleeves 200, whereupon the supporting member 198 may be moved freely upwardly through the guide sleeve 200 until locking pin 208 is disposed within its notches 212. In the preferred embodiment of this construction, the locking handles 226 are heavier than the locking collars 228, whereby the handles normally will move relative to the pivots in the upper ends of links 222 to dispose the locking collars 228 in their upper or locking position to engage the supporting members 198 when the bed of the vehicle tends to move downward relative to said supporting member. However, even when the locking collars are disposed in said normal positions, lowering movement of the supporting members 198 relative to the guide sleeves 200 may take place readily.

From the present drawings, the exemplary illustration of a truck is one wherein the bed 14 is directly supported by the frame of the truck. However, it is to be understood that the present invention equally is applicable to tractor-trailer type trucks for example, wherein a tractor unit is attached to a trailer unit, the trailer unit having a considerably longer bed that the truck illustrated in Fig. 1. Under such circumstances, the track members 18 and 20 would extend substantially the full length of the bed of the trailer unit. In order that the track members 18 and 20 would not have to be of cumbersome or abnormal size in supporting the frame 28 and mechanism carried thereby if adapted to a trailer unit or other truck bed of considerable length, it is contemplated that auxiliary supporting posts 230 may be used to augment the support afforded by members 16. An exemplary supporting post 230 is illustrated in Fig. 1. Said post is of simple construction and easily is positionable at any selected location along the bed of the trailer unit, said post extending between said bed and the underside of the lower surface of each of the track members 18 and 20.

Any suitable means may be used to position the supporting posts 230 relative to the trailer bed and track members. In Fig. 1 for example, the bed of the trailer unit is shown provided with a series of spaced holes 232 adjacent each side edge of the bed for the reception of a depending pin 234 fixed to the lower end of each post. The upper end of the posts 230 can be provided, for example, with a laterally extending flange 235 which has a hole therethrough to receive any suitable securing means such as a thumb screw 237 which is threaded into one of a series of threaded holes in the lower surface of the track members 18 and 20.

In operation, one or more of the auxiliary posts 230 can be placed selectively adjacent the location on one or both of the track members 18 and 20 where the greatest load will be sustained while either loading or unloading material with the mechanism but, of course, said posts will be placed in such position that they will not interfere with the swinging of the boom 68. Further, as the loading or unloading of the trailer unit progresses, the positions of the auxiliary supporting posts 230 can be changed, preferably so as to support the track members 18 and 20 adequately during the entire loading and unloading operations.

The material hoisting and handling mechanism described hereinabove also includes safety means to prevent damage to the mechanism as, for example; when either the boom 68 is rotated accidentally so as to contact one of the supporting members 16 or an auxiliary supporting post 230; while the sheave 98 is moving longitudinally in one direction or the other along the boom 68 and particularly when it is approaching its limit of movement in either of these directions; while the frame 28 is moving relative to the track members 18 and 20 and particularly when said frame approaches either of its limits of movement on said track members; and when the hoisting sheave 130 is moving vertically too close to the sheave 98. In its preferred embodiment, said safety mechanism utilizes exemplary electric switches as illustrated in Figs. 10 through 12 although it is to be understood that other suitable mechanism may be used, especially if power means other than electric motors are used to actuate the various movable members of the handling and hoisting mechanism comprising the present invention.

Figure 10:
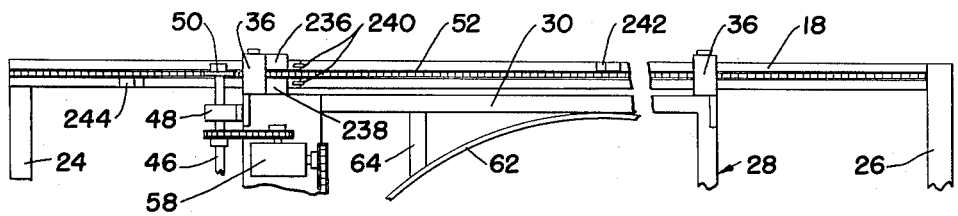
Fig. 10 is a fragmentary plan view showing part of the motor control mechanism.
Figure 11:
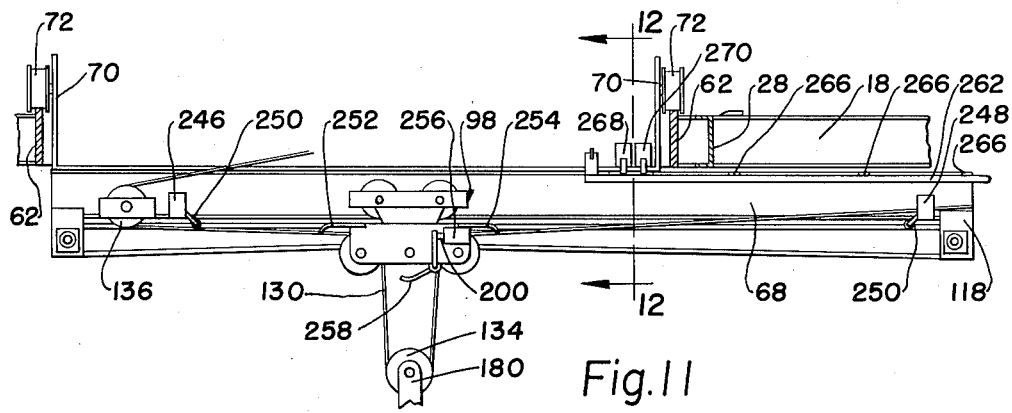
Fig. 11 is a fragmentary side elevation showing additional motor control mechanism.
Figure 12:
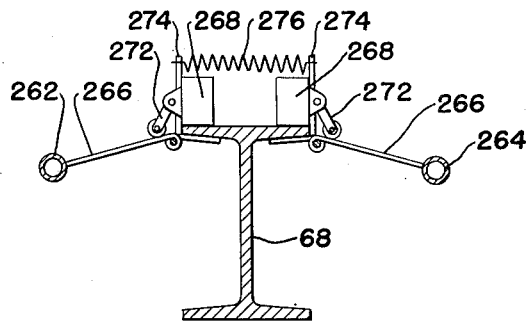
Fig. 12 is a sectional view on the line 12—12 of Fig. 11.

Referring to Figs. 10 through 12 specifically, the movement of frame 28 by the sprocket gears 50 is controlled particularly as said frame approaches its extreme limit of its movements, by movement limiting means comprising switches 236 and 238 which, in the exemplary illustration herein, have operating levers terminating in rollers 240 which respectively are engageable with actuating means comprising cams 242 and 244. Said cams are fixed to the upper flange, for example, of the track member 18 adjacent opposite edges thereof. The limiting switches 236 and 238 are connected in series with the circuit to the motor 54 which actuates the reduction gear mechanism 58. Thus, if through misjudgment or an oversight, an operator fails to notice that the frame 28 is moving too close to the forward end of track member 18, the roller 240 of limit switch 238 will engage cam member 244 and open the circuit to the motor 54 so as to stop the same.

Similarly, actuating cam 242 will be engaged by roller 240 of rearward movement limiting switch 236 when the frame 28 moves too closely to the outer or rear end of the track member 18. This, correspondingly, will result in stopping the motor 54 which drives the frame 28. It will be understood of course that the positions of the actuating cams 242 and 244 are such that a desired amount of additional movement will be afforded the frame 28 after the switches are opened in order that the momentum of the frame and the load supported thereby may be permitted to decelerate suitably before being brought to a complete stop.

Referring to Fig. 11, the movement of the sheave 98 relative to the boom 68 is controlled by an additional means comprising a pair of movement limiting switches 246 and 248 respectively positioned adjacent opposite ends of the boom and supported thereby. Said switches also have actuating arms 250 which are pivotally mounted and have rollers on the outer ends thereof engageable with operating means comprising cams 252 and 254 projecting longitudinally from opposite ends of the sheave 98 as clearly shown in Fig. 11. The actuating cams 252 and 254 have curved outer ends which are engaged by the rollers on the actuating arms 250 of the movement limiting switches 246 and 248, said switches being connected in series with the circuit of the motor 122 which actuates the sheave propelling chain 112.

From Fig. 11, it is clear that, as the sheave 98 is moving toward the inner end of boom 68, and assuming the operator fails to see the sheave approaching the same, the switch 246 will be actuated by actuating cam 252 and cause the motor 122 to stop. Similarly, if the sheave 98 is approaching the forward or outer end of the boom 68 too closely without being noticed by the operator, the switch 248 will be operated by its actuating cam 254 to stop the motor 122.

Fig. 11 also illustrates movement limiting mechanism comprising switch means for preventing damage to the hoisting mechanism. Thus, a movement limiting switch 256 is carried by the sheave 98 as shown in Fig. 11, said switch being connected within the circuit of hoisting motor 146. Preferably, a bell crank actuating lever 258 is pivotally supported intermediately of its ends on the lower portion of sheave 98, one arm of said bell crank being engageable by the sheave pulley 134 as said sheave approaches its upper limit of movement relative to sheave 98. Upon said arm being contacted by sheave 134, the other end of the bell crank will operate means such as an exemplary plunger 260 of switch 256 to open said switch and stop motor 146. The shape and size of the end of bell crank 258 engaged by sheave 134 is such that a desired amount of overtravel of the sheave 134 may take place before its movement is brought to a final stop.

Swinging of the boom 68 about the vertical axis of circular track 62 also is controlled safely by mechanism illustrated in Figs. 11 and 12. The exemplary mechanism for accomplishing this, as illustrated herein, comprises a pair of contact bars 262 and 264 which extend substantially parallel to the outer end of boom 68 and in laterally spaced relation to the sides of the boom 68, as best shown in Fig. 12. The bars 262 and 264 are supported by a plurality of arms 266 hingedly connected to boom 68, the inner hinged ends thereof preferably being supported directly by the upper flange of said boom. A plurality of such hinged arms are spaced longitudinally along the boom and bars 262 and 264 as shown in Fig. 11. Movement limiting switches 268 and 270 are mounted, for example, upon the upper surface of boom 68, as shown in these figures. Said switches preferably have pivotally supported actuating arms 272 provided with rollers on the outer ends thereof for engagement with hinged arms 266.

Fixed to and projecting radially from the inner end of each of the bars 262 and 264, for example, is a pair of fingers 274. Extending between the upper ends of fingers 274 is any suitable contracting means such as a coil spring 276 which restores the bars 202 and 264 to the normal positions thereof which are as shown in Fig. 12. Spring 276 also will maintain said arms in said position. When the arms 266 and fingers 274 are in the positions shown in Fig. 12, the switches 268 and 270 will be closed.

If the boom, 68, while swinging about its vertical axis in one direction or the other, should accidentally contact, for example, one of the rear supporting members 16, or one of the auxiliary supporting posts 230 or any other means intersecting or obstructing its movement, either the contact bar 262 or 264 which encounters such obstructing means first will engage the same and will be moved downwardly as viewed in Fig. 12, about the pivots of its supporting arms, causing the actuating arm of one or the other of the movement limiting switches 268 or 270 likewise to move downwardly and open the switch. Such opening of said switch will stop the motor 92 which rotates the boom and auxiliary frame 154 about the vertical axis of track 62. Yielding of spring 276 will permit such downward movement of the contact bars 262 and 264. Thus, damage to the boom mechanism and the obstructing object usually will be prevented.

Upon the operator freeing the boom from engagement with the obstructing means, the spring 276 will restore either the contact bar 262 or 264 to its normal position and also cause the movement limiting switch which has been opened to close the same and thus restore the circuit to the motor 92. From Fig. 11, it will be seen that the contact bars 262 and 264 preferably only extend from about the mid-portion of the boom 68 to and slightly beyond the outer end thereof.

Obviously, if an operator desires to have the limiting switches of the mechanism intentionally cause stopping of the movement of any of the parts of the hoisting and handling mechanism, such switches can be relied upon to do this without requiring operation of the switches of the main control switch box 190. However, the movement limiting switches described above nevertheless afford safety means to prevent damage to the mechanism due to movement of the various parts of the mechanism past intended limits during the operation thereof. Also, in positioning said movement limiting switches, sufficient overtravel of the movable part controlled thereby is provided in order that deceleration of the load may take place suitably before the movable member actually comes to a full stop.

It will be seen from the above description of the mechanism illustrated in Figs. 10 through 12 that the safety control mechanism which includes a number of movement limiting switches for the various operating motors of the mechanism affords simple and effective means for preventing damage to the various movable members of the mechanism if such movement thereof extends beyond certain predetermined limits either through inattention or intent of the operator. Also, it is to be understood that the specific embodiments of movement limiting means for the mechanism primarily are exemplary and variations of such specific means is possible within the spirit of the invention. Also, the positions of the switches and the operating means therefor may be exchanged with each other, especially regarding the switches and operating means controlling movement of frame 28 and sheave 98.

The power means for moving frame 28, sheave 98, hoisting sheave 134 and for rotating boom 68 comprises electric motors in the preferred embodiment of the invention. Accordingly, the safety movement limiting or control means are electric switches. However, other power means could be used such, for example, as fluid or hydraulic motors. If these are selected within the purview of the invention, then safety control means could comprise valves in the fluid lines to the motors, the valves being operated by suitable actuating means disposed, for example, in the path of movement of the various movable members which are controlled thereby.

While the invention has been shown and illustrated in its several preferred embodiments, and has included certain details, it should be understood that the invention is not to be limited to the precise details herein illustrated and described since the same may be carried out in other ways falling within the scope of the invention as claimed.

We claim:

1. In combination with a vehicle, material hoisting and handling mechanism comprising a pair of substantially parallel track members extending substantially in spaced parallel relationship to each other and the bed of said vehicle, means adjacent opposite ends of and extending above said bed means supporting said tracks fixedly in elevated position above said bed, a frame extending between said track members substantially within the plane thereof and movable longitudinally along said members, means operable to propel said frame along said track members, a circular track member connected to said frame substantially within the plane thereof, the interior of said circular track being substantially unobstructed, an auxiliary frame extending substantially diametrically across said circular track and supported at its ends within said track by rollers engaging said track for movement within the plane of said track and about the axis thereof, a boom extending along and fixed to the underside of said auxiliary frame and at one end projecting therebeyond to comprise a cantilever type extension, a sheave supported by rollers for movement along said boom and depending therefrom, a hoisting cable supported by said sheave and movable relative thereto, a hoisting drum mounted on said auxiliary frame and around which said cable is coiled for actuation thereby, drive means for said auxiliary frame carried thereby and including gears rotatable at opposite ends of said frame engageable with means on said circular track, power energizable prime movers carried by said auxiliary frame and respectively operable selectively to drive said sheave along said boom and actuate said hoisting drum and rotate said auxiliary frame and boom about the axis of said circular track, a sheave supported by said hoisting cable, load supporting means, frame-like means connected to said load supporting means and spaced thereabove in normal use position, and means depending from said sheave on said hoisting cable and adjustably carried by said frame-like means for movement selectively within a normally substantially horizontal plane in directions substantially transverse to each other, whereby said sheave on said hoisting cable may be positioned vertically above the center of gravity of a load on said load supporting means.

2. In combination with a vehicle, material hoisting and handling mechanism comprising a pair of substantially parallel track members extending substantially in spaced parallel relationship to each other and the bed of said vehicle, means adjacent opposite ends of and extending above said bed means supporting said tracks fixedly in elevated position above said bed, a frame extending between said track members substantially within the plane thereof and movable longitudinally along said members, means operable to propel said frame along said track members, a circular track member connected to said frame substantially within the plane thereof, an auxiliary frame extending substantially across said circular track and supported at its ends within said track by rollers engaging said track for movement within the plane of said track and about the axis thereof, a boom extending along and fixed to the underside of said auxiliary frame and at one end projecting therebeyond to comprise a cantilever type extension, a sheave supported by rollers for movement along said boom and depending therefrom, a hoisting cable supported by said sheave and movable relative thereto, a hoisting drum mounted on said auxiliary frame and around which said cable is coiled for actuation thereby, drive means for said auxiliary frame carried thereby and comprising a rotatable shaft extending longitudinally of said auxiliary frame and also including gears rotatable at opposite ends of said frame engageable with rack-like means fixed internally to said circular track, gear means at each end of said shaft interconnecting said shaft to said rotatable gears on said frame for simultaneous actuation thereof at diametrically opposed portions of said circular track, said shaft being rotatable selectively in opposite directions, whereby said auxiliary frame and the boom thereon readily are rotatable simultaneously in either direction about the vertical axis of said circular track, and power energizable prime movers carried by said auxiliary frame and respectively operable selectively to drive said sheave along said boom and actuate said hoisting drum and rotate said shaft upon said auxiliary frame to move said frame and boom thereon about the axis of said circular track.

3. The hoisting and handling mechanism set forth in claim 2 further characterized by said gear means at each end of said shaft comprising sets of meshing bevel gears, one bevel gear of each set being fixed to said shaft, and the other bevel gear of each set being fixed to a vertical shaft rotatably supported by said auxiliary frame.

4. In combination with a vehicle, material hoisting and handling mechanism comprising a pair of substantially parallel track members extending substantially in spaced parallel relationship to each other and the bed of said vehicle, means adjacent opposite ends of and extending above said bed means supporting said tracks fixedly in elevated position above said bed, a frame extending between said track members substantially within the plane thereof and movable longitudinally along said members, said frame comprising pairs of flanged structural members of which one pair extends transversely between said track member and the members of the other pair of which extend respectively parallel to and adjacent the inner sides of said track members and are connected at the ends thereof to said first pair of members to form a substantially rectangular frame, means operable to propel said frame along said track members, a circular track member which is vertically cylindrical connected to said frame substantially centrally thereof within the plane thereof by means extending between said frame and track and connected at the ends thereto, an auxiliary frame extending substantially across said circular track and supported at its ends within said track by rollers engaging said track for movement within the plane of said track and about the axis thereof, a boom extending along and fixed to the underside of said auxiliary frame and at one end projecting therebeyond to comprise a cantilever type extension, a sheave supported by rollers for movement along said boom and depending therefrom, a hoisting cable supported by said sheave and movable relative thereto, a hoisting drum mounted on said auxiliary frame and around which said cable is coiled for actuation thereby, drive means for said auxiliary frame carried thereby and including gears rotatable at opposite ends of said frame engageable with means on said circular track, and power energizable prime movers carried by said auxiliary frame and respectively operable selectively to drive said sheave along said boom and actuate said hoisting drum and rotate said auxiliary frame and boom about the axis of said circular track.

5. The hoisting and handling mechanism set forth in claim 4 further characterized by the supporting rollers on said auxiliary frame being grooved peripherally and said grooves receiving the upper surface of said circular track, the vertically extending connecting plates terminating below the upper edge of said track.

6. In combination with a vehicle having a substantially flat bed, upright members fixed to said bed substantially at the corners thereof and extending upwardly therefrom, a pair of substantially horizontal and parallel track members connected to the upper ends of said upright members and extending in spaced parallel relationship to each other, and material handling and hoisting mechanism supported by said track members for movement along said tracks and including a frame extending between said track members substantially within the plane thereof and movable longitudinally along said members, rack-like means extending along said tracks, a shaft rotatably carried by said frame and extending thereon between said track members, gears fixed to said shaft and engageable with said rack-like means, a prime-mover carried by said frame and interconnected to said shaft, said prime mover being operable to rotate said shaft in opposite directions, thereby selectively to move said frame in opposite directions along said track means, a circular track member carried by said frame substantially centrally thereof, a boom extending substantially diametrically across the lower end of said circular track and projecting at one end therebeyond, members extending upward from said boom adjacent the inner surface of said circular track, rollers carried by said members and engaging said track to support said boom for rotation within a plane parallel to and below said track and about the vertical axis thereof, a sheave supported by rollers for movement along said boom and depending therefrom, a hoisting cable supported by said sheave and movable relative thereto, a hoisting drum interconnected to the upper surface of said boom and within said circular track, said cable being coiled around said drum for actuation thereby, drive means for rotating said boom about said vertical axis interconnected to said boom within said circular track and including gears engageable at diametrically opposed positions relatively to said track with rack-like means on said circular track, and power energizable prime movers interconnected to said boom within said circular track and respectively operable selectively to drive said sheave along said boom, actuate said hoisting drum, and rotate said boom about said vertical axis of said circular track.

7. The structure set forth in claim 6 further including a material engaging and supporting member having means at the upper end thereof engaged by said hoisting cable supported by said sheave and operable to be raised and lowered by said hoisting drum and also be moved by said sheave along said boom, thereby to support said member at positions beyond the sides and end of said bed of said vehicle.

8. Material engaging means including in combination, load supporting means, frame-like means connected to said first mentioned means and spaced thereabove in normal use position, and hoist engageable means adjustably carried by said frame-like means for variable positioning relative thereto within a normally substantially horizontal plane and in directions substantially transverse to each other within said plane, whereby said hoist engageable means is positionable vertically above the center of gravity of material carried by said load supporting means.

9. Material engaging and supporting mechanism comprising in combination, load supporting means, connecting means extending upward from one side thereof, substantially horizontal frame-like means connected at one side to said connecting means and extending over said load supporting means, said frame-like means comprising a pair of substantially parallel rails spaced horizontally apart, a bar extending between said rails and at its ends slidably engaging said rails for adjustable positioning therealong, and hoist-engageable means slidable along said bar, whereby said hoist-engageable means is positionable vertically above the center of gravity of material supported upon said loading supporting means.

10. The material engaging and supporting mechanism set forth in claim 9 further characterized by said hoist-engageable means comprising a sleeve receiving and slidable along said bar and including an arm extending laterally from said sleeve and substantially parallel to said bar in a vertical plane, the outer end of said arm being engageable by hoisting means and, upon being hoisted, binding said sleeve relative to said bar to effect locking therebetween.

11. A material supporting fork unit comprising a plurality of substantially C-shaped members spaced transversely apart, the lower legs of said C-shaped members comprising material engaging and supporting fingers, a pair of substantially parallel rails spaced transversely apart and extending transversely between the upper legs of said C-shaped members and connected thereto, a bar extending between said rails and the opposite ends thereof being slidably interconnected to said rails for adjustable movement therealong substantially in parallelism to said C-shaped members, and hoist-engageable means slidably movable along said bar, whereby said hoist-engageable means is positionable vertically above the center of gravity of material supported upon said lower legs of said C-shaped members.

12. The material supporting fork unit set forth in claim 11 further characterized by the rails thereof comprising longitudinally slotted plates which are substantially horizontal in normal position of use, the lower portions of said plates being connected to the upper legs of said C-shaped members and the upper portions each comprising a rail, a bar extending between said rails also having sleeves fixed to the opposite ends thereof which respectively slidably receive said rails of said slotted plates.

13. Material engaging unit including in combination, load supporting means comprising a plurality of substantially parallel finger-like members spaced transversely to each other, frame-like means positioned above said members in normal use, means extending between and connecting said frame-like means to one end of said finger-like members, sleeve-like means slidable along said frame-like means in a direction substantially parallel to said finger-like members, arm means projecting horizontally during use from one end of said sleeve-like means and being substantially parallel to said finger-like members, and sheave means connected to the projecting end of said arm means and arranged to be connected to hoisting means, said sleeve-like means being slidably positionable along said frame-like means to dispose said sheave means substantially above the center of gravity of a load upon said finger-like members, whereby when said unit is hoisted said sleeve-like means will bind frictionally upon said frame-like means and effect locking therebetween.

14. A vehicle having a load receiving bed, an overhead frame including parallel track members supported above said bed by substantially vertical members positioned near the ends of said track members, a frame movable along said track members above the bed of said vehicle, and load supporting means carried by said frame for movement relative to said bed, in combination with an auxiliary supporting member positionable substantially vertically between said vehicle bed and one of said track members at selected positions therealong to supplement said vertical supporting members and brace said track member from undue flexing under load sustaining conditions.

15. The combination set forth in claim 14 further including positioning means on opposite ends of said auxiliary supporting member coengageable respectively with means on said track member and vehicle bed and operable to maintain said supporting member in desired operative position relative thereto.

16. A vehicle having a load-receiving bed, overhead track means extending along and above said bed, a frame movable along said track means, a boom extending substantially horizontally and supported by said frame for rotation about a substantially vertical axis, drive means including an electric motor interconected to said boom and operable to move said boom about said axis, and a circuit connecting said motor to a source of current, in combination with switch means carried by said boom and connected in said circuit and including switch operating members, switch operating bars extending along said boom from the outer end thereof inwardly and substantially parallel thereto but respectively spaced laterally away from the opposite sides thereof, and supporting means carried by said boom and operable movably to support said bars and engage said switch operating members to actuate the same, said bars being operable to engage any obstructing means during pivoted movement of said boom and thereby cause actuation of said switch means to open said motor circuit and stop said motor and boom drive means.

17. A vehicle including a load receiving bed, overhead track means extending along and above said bed, a frame movable along said track means, a boom supported by said track means and movable therewith, a sheave movable selectively along said boom in opposite directions toward the opposite ends of said boom, a hoisting cable supported by and movable relative to said sheave, said cable having a portion depending from said sheave, load supporting means carried by said portion of said cable extending below said sheave, hoisting means operable to move said cable and load supporting means in hoisting and lowering directions selectively, driving means for said hoisting means including an electric motor, a circuit connecting said electric motor to a source of current, and a safety switch carried by said sheave and connected in said circuit, said safety switch including operating means positioned to be engageable by said load supporting means when hoisted upwardly to a predetermined position, whereby said switch is opened to stop said motor and hoisting mechanism.

18. The structure set forth in claim 17 further characterized by said load supporting means including a pulley around which said cable passes, and the actuating means for said switch comprising a lever engageable by said pulley upon said pulley being elevated to a predetermined position relative to said sheave.

References Cited in the file of this patent

UNITED STATES PATENTS

| | | |
|---|---|---|
| 1,748,708 | Fitch | Feb. 25, 1930 |
| 2,025,575 | Danz | Dec. 24, 1935 |
| 2,177,525 | Henderson | Oct. 24, 1939 |
| 2,177,941 | Knudson et al. | Oct. 31, 1939 |
| 2,257,873 | Troche | Oct. 7, 1941 |
| 2,350,701 | Stueland | June 6, 1944 |
| 2,358,767 | Breslav | Sept. 19, 1944 |
| 2,495,658 | Moseley | Jan. 24, 1950 |
| 2,499,442 | Wright | Mar. 7, 1950 |
| 2,553,378 | Miller | May 15, 1951 |
| 2,557,253 | Belden | June 19, 1951 |
| 2,646,180 | Schlough et al. | July 21, 1953 |